United States Patent
de Groot et al.

(10) Patent No.: US 7,634,757 B2
(45) Date of Patent: Dec. 15, 2009

(54) ENSURE A CONSISTENT CONTROL SYSTEM CONFIGURATION METHODOLOGY THROUGH AN ENFORCEABLE USER DEFINED DEVELOPMENT LIFE CYCLE

(75) Inventors: Erik de Groot, Huizen (NL); Jeffrey B. Scott, Lexington, VA (US); Juergen Rudnick, Hanau (DE)

(73) Assignee: Honeywell International Inc., Morristown, NJ (US)

( * ) Notice: Subject to any disclaimer, the term of this patent is extended or adjusted under 35 U.S.C. 154(b) by 530 days.

(21) Appl. No.: 10/729,771

(22) Filed: Dec. 8, 2003

(65) Prior Publication Data

US 2005/0125794 A1 Jun. 9, 2005

(51) Int. Cl.
G06F 9/44 (2006.01)
G06F 12/00 (2006.01)
(52) U.S. Cl. .................. 717/122; 717/169; 717/170; 707/203
(58) Field of Classification Search .................. 717/122
See application file for complete search history.

(56) References Cited

U.S. PATENT DOCUMENTS

| | | | | |
|---|---|---|---|---|
| 6,115,646 | A * | 9/2000 | Fiszman et al. | 700/181 |
| 6,260,040 | B1 * | 7/2001 | Kauffman et al. | 707/10 |
| 6,654,747 | B1 * | 11/2003 | Van Huben et al. | 707/10 |
| 6,754,885 | B1 * | 6/2004 | Dardinski et al. | 717/113 |
| 7,000,118 | B1 * | 2/2006 | Murthy et al. | 713/185 |
| 7,278,106 | B1 * | 10/2007 | Mason | 715/744 |
| 2003/0190593 | A1 * | 10/2003 | Wisnosky et al. | 434/362 |
| 2005/0071658 | A1 * | 3/2005 | Nath et al. | 713/193 |

OTHER PUBLICATIONS

"Exploiting versions for on-line data warehouse maintenance in MOLAP servers", Kang et al., August, pp. 742-753. Online retrieved at <http://delivery.acm.org/10.1145/1290000/1287433/p742-kang.pdf>.*
"Modules, abstract types, and distributed versioning", P. Sewell, Jan. 2001, pp. 236-247. Online retrived at <http://delivery.acm.org/10.1145/370000/360225/p236-sewell.pdf>.*
"Dynamic versioning concurrency control for index-based data access in main memory database systems", Xia et al., Oct. 2001, pp. 550-552 . Online retrieved at <http://delivery.acm.org/10.1145/510000/502686/p550-xia.pdf>.*
"On-line warehouse view maintenance", Quass et al., Jun. 1997, pp. 393-404. Online retrieved at <http://delivery.acm.org/10.1145/260000/253352/p393-quass.pdf>.*

* cited by examiner

Primary Examiner—Tuan Q Dam
Assistant Examiner—Thuy Dao
(74) Attorney, Agent, or Firm—Ohlandt, Greeley, Ruggiero & Perle, LLP

(57) ABSTRACT

A user-defined development life cycle component is part of a qualification and version control system that is an integral part of a configuration toolset in a process automation system. The user enables and defines a development life cycle to be used by defining qualification states and their attributes, including the authorized state transitions and security and requirements for each transition, such as electronic signatures. Attributes define how each control object is treated in the system. For example, a "load to controller" flag defines if the control object is loadable to a controller when it is in a particular qualification state. A fallback state defines a qualification state in which the control object continues its life cycle when it is modified and checked-back-into the system. Through a restricted state definition, the user implements the "four-eye principle" so that two consecutive state changes are made by two different users.

34 Claims, 16 Drawing Sheets

ENSURE A CONSISTENT CONTROL SYSTEM CONFIGURATION METHODOLOGY THROUGH AN ENFORCEABLE USER DEFINED DEVELOPMENT LIFE CYCLE

BACKGROUND OF THE INVENTION

1. Field of the Invention

The present disclosure generally relates to source control systems and development life cycles. In particular, the present disclosure relates to regulated industry, development, qualification, process automation, and other applications and features.

2. Discussion of the Background Art

A systems development life cycle (SDLC) model is also called the life cycle or the waterfall model. The life cycle model is an approach to developing an information system or software product in a sequence of steps that progress from start to finish. Typically the steps include system requirements, software requirements, analysis, program design, coding, testing, and maintenance. The life cycle model is one of the oldest systems development models and is still probably the most commonly used.

Source control is also known as configuration management and change management. Source control is a discipline of making changes to source code in a planned and systematic fashion. The purpose of source control is to formally control the integrity of artifacts (items) and activities (tasks). In a source control system, objects are checked-out, edited, and then checked-in. Each time an object is checked-in, it is given a version number. Over time, a history of changes is created for the objects under the control of the source control system.

The items under control in a source control system includes objects, such as control strategies. In object-oriented programming (OOP), objects are abstractions used in designing a program and they are also the units of code that are eventually derived from the design process. In between, each object is made into a generic class of objects and even more generic classes are defined so that objects can share models and reuse the class definitions in their code. Each object is an instance of a particular class or subclass with the class's own methods or procedures and data variables. Thus, objects typically exist in a hierarchy of objects with parent and child relationships. An object is usually a binary, text, or other type of file.

Process control systems are used to control and monitor complex processes in many types of industrial settings, including refineries, pharmaceuticals, power and chemical plants, and pulp, paper and printing mills. One example is Experion PKS™ available from Honeywell.

Many industries need to comply with regulations from federal agencies, such as the Food and Drug Administration (FDA) or the Environmental Protection Agency (EPA). In many cases, the overall production process, including a process automation system, needs to be validated. For the process automation system, this means that development needs to be performed in a consistent manner following standard operating procedures, maintaining a change history of configuration control. This is a complicated and time-consuming effort and there is a need for it to be automated and enforced. This would reduce the work and cost associated with the overall validation effort.

There is a need for a way for a user to define and use a development life cycle as part of a configuration tool in a process automation system. The configuration tool would automate and enforce the development life cycle for each individual control object through user predefined qualification states. The developer would only be able to make predefined qualification state transitions to which he or she was granted access. The sign-off in typical standard operating procedures is performed manually on printed-paper. There is a need for automating the sign-off and logging each interaction with the developers, such as the action performed and the time and date. This would prevent the control objects that are not yet intended to be part of the production process from being loaded. This would also prevent important development steps like testing and validation from being skipped.

SUMMARY OF THE INVENTION

The present invention has many aspects and is generally directed to ensuring a consistent control system configuration methodology through an enforceable user defined development life cycle.

One aspect is a method for enforcing a life cycle process in a source control system. A user-defined life cycle process is received having a plurality of states, where each state has attributes. User-defined state transitions between the states are received. A change state function is provided for changing a current state associated with an object to a next state associated with the object, where the change state function verifies compliance with the user-defined state transitions. Version control is provided for the object in the source control system.

Another aspect is a computer readable medium, such as a floppy disk, a website or the like having executable instructions stored thereon to perform a method of determining permissions for actions with an object based on a state of the object. The instructions are executable on a processor. A request to perform an action with the object is received. It is determined whether the object has ever been checked-in to the source control system. It is determined whether the object is currently checked-in. A definition of the state of the object is retrieved. It is determined from the definition whether the action is permissible in the state. A permission status is provided.

Another aspect is a computer readable medium having executable instructions stored thereon to perform a method of validating state transitions. A request to make a state transition for an object from a user is received. It is determined whether the object is checked-in. It is determined whether the user has permission to make the state transition based on a user-defined state transition model. The state transition is permitted only if the user has permission. The state transition status is provided.

Another aspect is a computer readable medium having executable instructions stored thereon to perform a method of validating a state transition. It is determined whether a next state in a state transition request from a user is allowed from a current state in the state transition request based on user-defined transition restrictions. It is determined whether the user has permission to make the state transition based on user-defined transition restrictions. A state transition status is provided.

Another aspect is a computer readable medium having executable instructions stored thereon to perform a method of validating a state transition. It is determined whether the current state transition in a state transition request for an object from a user requires an electronic signature based on user-defined transition restrictions. It is determined whether a previous state transition for the object required a previous electronic signature, if the current state transition requires a current electronic signature. The current state transition is allowed only if the previous electronic signature is different than the current electronic signature. A validation status is provided.

Another aspect is a computer readable medium having executable instructions stored thereon to perform a method of determining a new state for an object version upon check-in. It is determined whether the object is being checked-in for the first time. A first fallback state for a first pre-defined state is retrieved, if the object is being checked-in for the first time. The first fallback state is provided, if the object is being checked-in for the first time.

Another aspect is a computer readable medium having executable instructions stored thereon to perform a method of processing the addition of a state. A definition of a new state is received from a user, where the definition includes a name and a fallback state. It is determined whether the name is unique among existing state definitions. The fallback state is validated. The definition is added to a source control system, only if the name is unique and the fallback state is valid.

Another aspect is a computer readable medium having executable instructions stored thereon to perform a method of processing the modification of a state. A modified definition of a state is received from a user, where the modified definition includes a name and a fallback state. It is determined whether the name is unique among existing state definitions. The fallback state is validated. The modified definition is updated in a source control system, only if the name is unique and the fallback state is valid.

Another aspect is a computer readable medium having executable instructions stored thereon to perform a method of processing the deletion of a state. A request to delete a state definition for the state is received from a user. It is determined whether the state definition is referenced by any other state definition in a source control system. It is determined whether any objects in the source control system have a current state equal to the state. The state definition is deleted from the source control system, only if the state definition is not referenced by any other state definition in the source control system and no objects in the source control system have the current state equal to the state.

Another aspect is a source control system for a process control system which comprises a processor, a life cycle process component, a version control component, and a controller. The life cycle process component is executable on the processor to enforce compliance with user-defined life cycle states. The version control component is executable on the processor to associate a version number with each object. The controller is in communication with the processor via a network to be loaded with the objects to provide process control for a plurality of devices.

BRIEF DESCRIPTION OF THE DRAWINGS

These and other features, aspects, and advantages of the present disclosure will become better understood with reference to the following description, appended claims, and drawings where:

FIG. 14 is a flow chart of an example method of determining the qualification state for an object version upon check-in;

DETAILED DESCRIPTION OF THE PREFERRED EMBODIMENT

Figure 1:
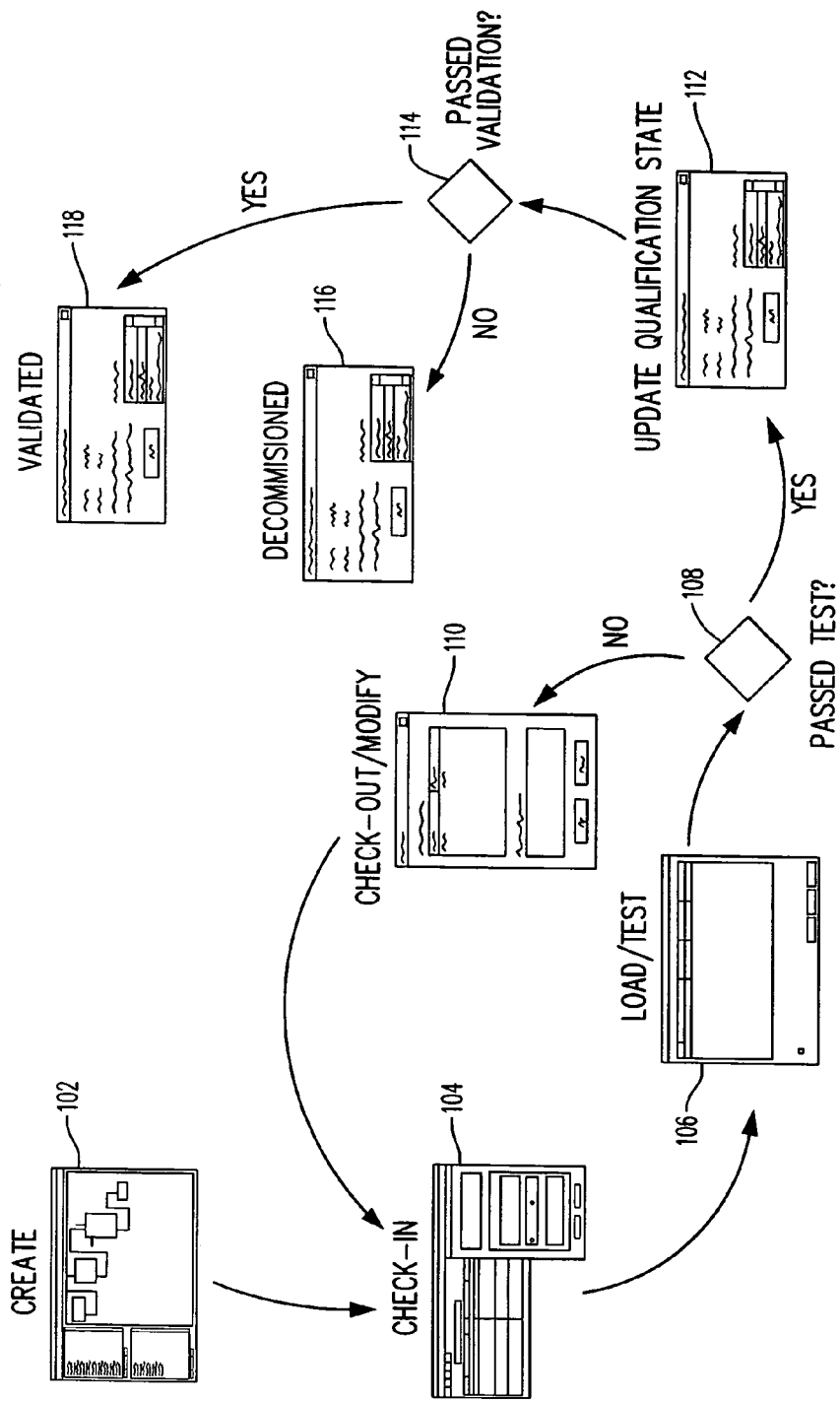
FIG. 1 is a flow chart of an example life cycle in a source control system.

FIG. 1 shows an example life cycle in a source control system. In this example, the life cycle is defined by the qualification states {implemented, tested, decommissioned, validated}. First, a control strategy is created 102. Then, the control strategy is checked-in to the source control system 104 and its qualification state is set to "implemented". After it is checked-in, the control strategy is loaded to a controller and tested 106. If the control strategy does not pass the test 108, it is checked-out and modified 110 and, then, checked-in again 104. Once the control strategy passes the test 108, its qualification state is updated to "tested" 112. Next, the control strategy is validated. If the control strategy does not pass validation 114, its qualification state is set to "decommissioned" 116; otherwise, its qualification state is set to "validated". The present invention includes a method for users to track life cycle phases or states, such as the sequence of qualification states for control strategies in the above example. States may be any type of state associated with a life cycle process, such as a qualification state. The present invention is not limited to particular life cycle phases or qualification states.

Figure 2:
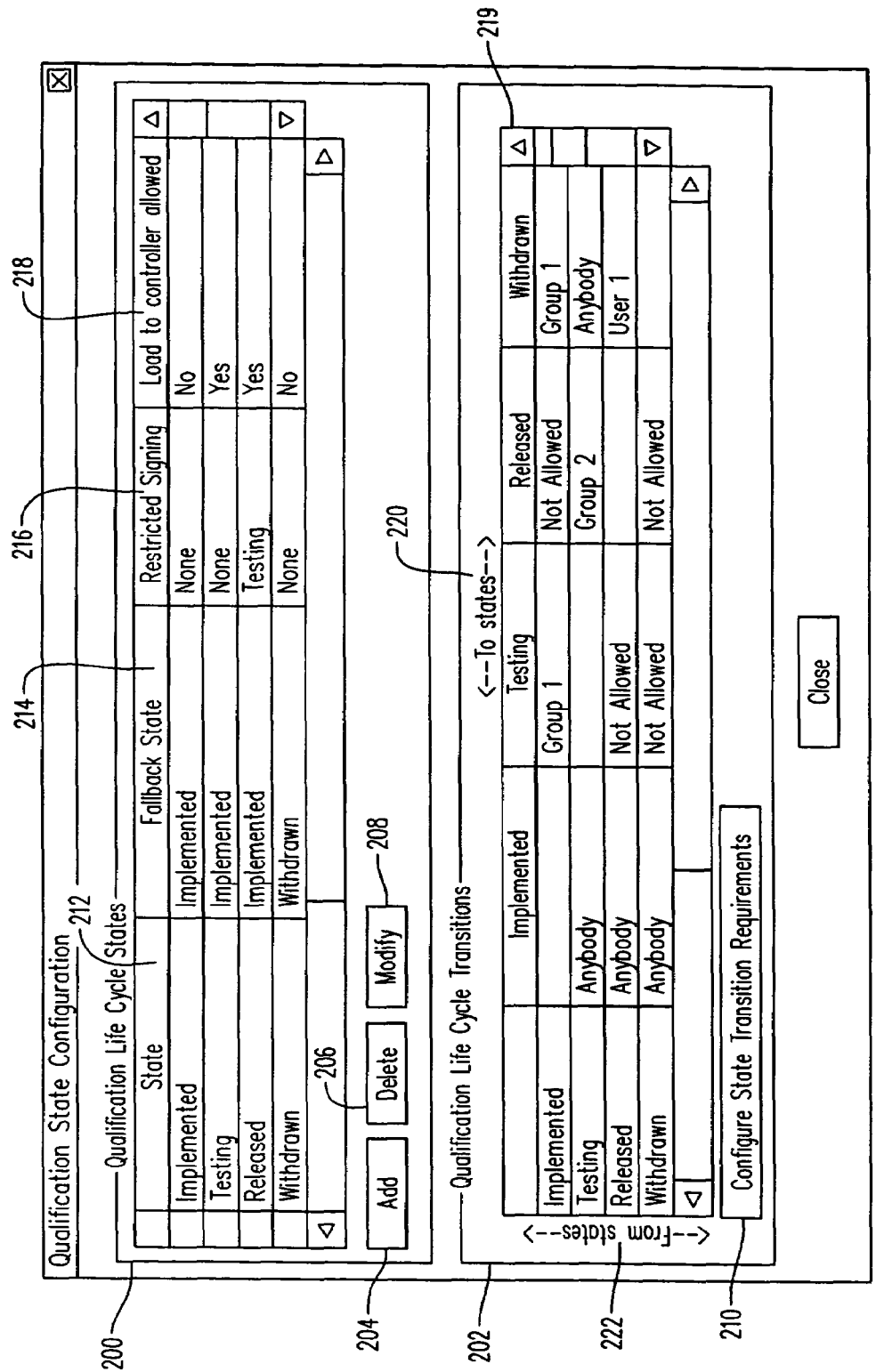
FIG. 2 is a screenshot of an example user interface for a qualification life cycle configuration.

FIG. 2 shows an example user interface for a qualification life cycle configuration. In this example, qualification state refers to the stages a control strategy passes through as part of the customer's qualification process for the control strategy. For example, a customer may define {implemented, tested, released, withdrawn} as states for tracking the process. The control strategy object goes through these different states as it is developed and refined. In some cases, the control strategy goes through certain states in order to be qualified. For example, the control strategy needs to be implemented and tested before it is released.

In FIG. 2, qualification life cycle states 200 and qualification life cycle transitions 202 are configurable by a user. Add 204, delete 206, and modify 208 functions are provided for qualification life cycle states 200 and a configure state transition requirements function 210 is provided for qualification life cycle transitions 202. In this example, the user has defined {implemented, testing, released, withdrawn} as the qualification states 212. Each qualification state is assigned a fallback state 214. Each qualification state has a value for whether there is restricted signing 216, and whether loading to the controller is allowed 218. In this example, the user has defined state transitions in a grid 219 with columns "to states" 220 and rows "from states" 222 for qualification life cycle transitions 202. In this example, some state transitions are grayed out (e.g., implemented to implemented) because they are not possible, some state transitions are not allowed, and others are assigned users or groups of users, who are allowed to make the transition. Grid 219 shows all the qualification states defined in the first row and first column of grid 219. The user has an option of configuring electronic signatures for state transitions. For example, if the user wants to configure electronic signature for the transition from implemented to testing, then the user chooses the cell with the row corresponding to implemented and the column corresponding to testing and clicks on configure transition requirements 210.

Figure 3:
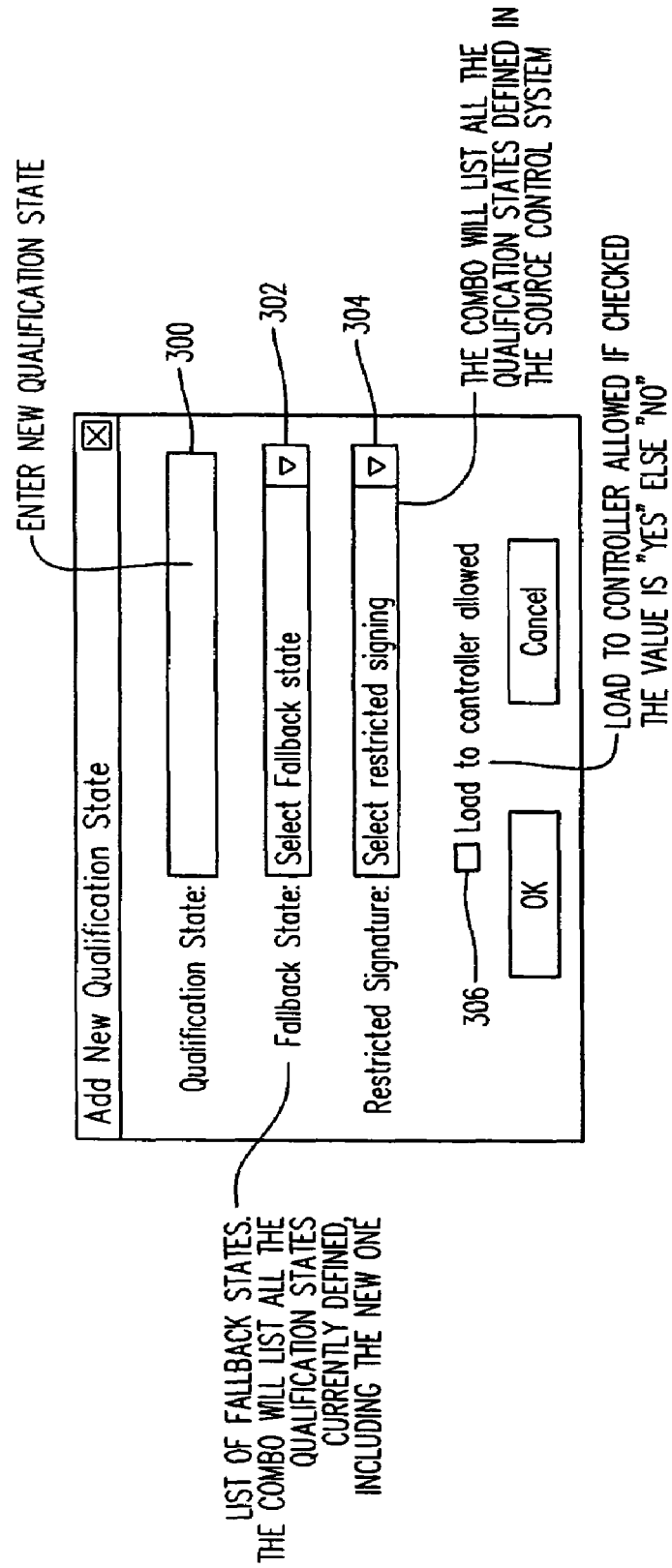
FIG. 3 is a screenshot of an example user interface for adding a new qualification state.

FIG. 3 shows an example user interface for adding a new qualification state. This user interface is displayed when the user selects add 204 from the user interface in FIG. 2 and it prompts the user to enter a new qualification state 300, a fallback state 302, whether there is restricted signing 304, and whether load to controller is allowed 306.

Figure 4:
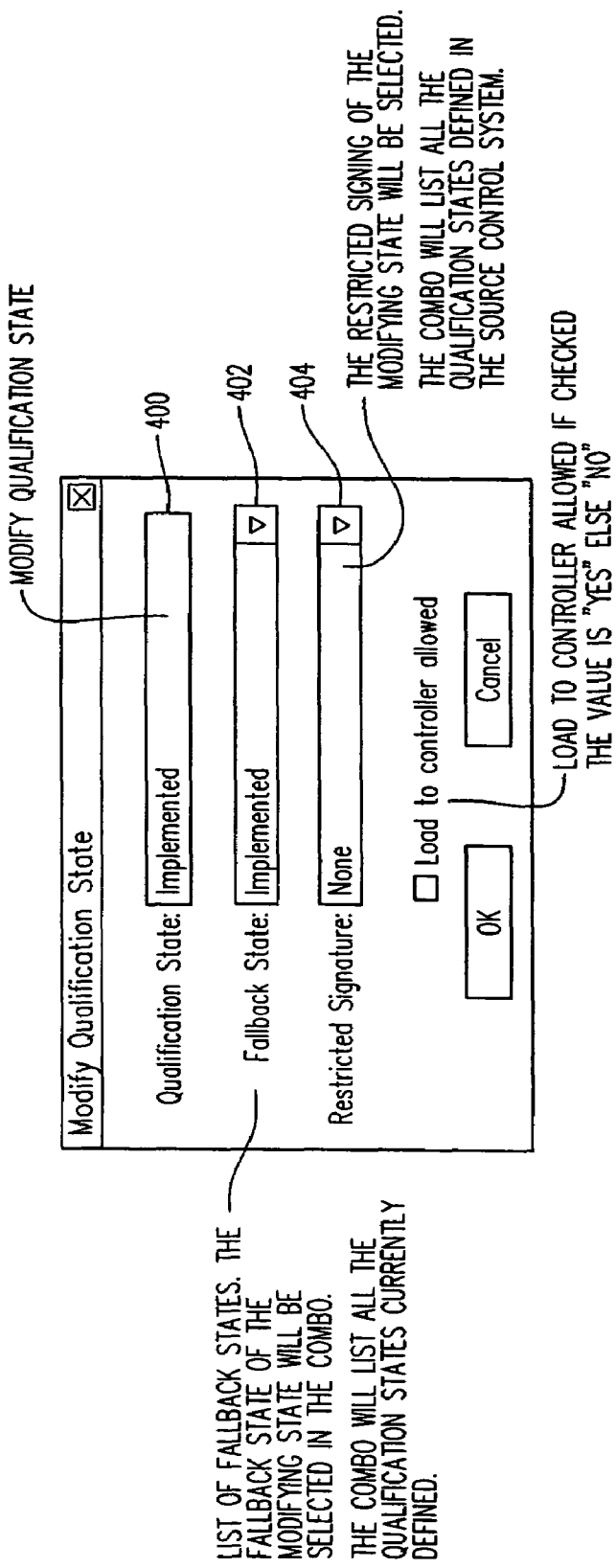
FIG. 4 is a screenshot of an example user interface for modifying a qualification state.

FIG. 4 shows an example user interface for modifying a qualification state. This user interface is displayed when the user selects modify 208 from the user interface in FIG. 2 and it shows the user the name of the qualification state being modified 400, its current fallback state 402, whether there is restricted signing 404, and whether load to controller is allowed 406. These fields are editable.

Figure 5:
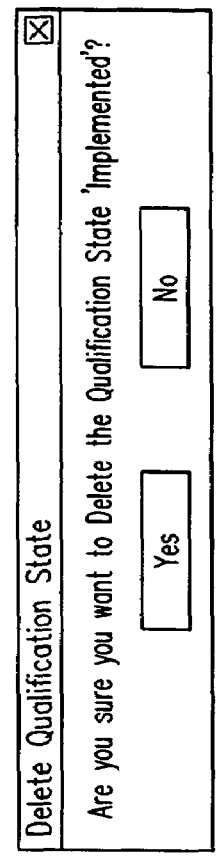
FIG. 5 is a screenshot of an example user interface for deleting a qualification state.

FIG. 5 shows an example user interface for deleting a qualification state. This user interface is displayed when the user selects delete 206 from the user interface in FIG. 2 and it confirms the delete action.

Figure 6:
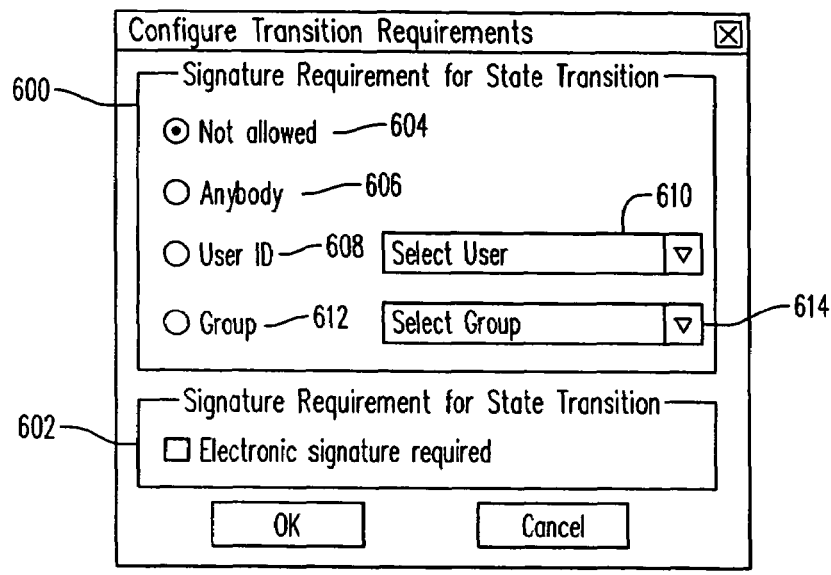
FIG. 6 is a screenshot of an example user interface for configuring state transition requirements.

FIG. 6 shows an example user interface for configuring state transition requirements. This user interface is displayed when the user selects a cell in grid 219 and clicks on configure transition requirements 210 from the user interface in FIG. 2. The current state transition requirement values are displayed 600 and the user chooses whether there is a signature requirement for the state transition 602. "Not allowed" 604 indicates that the state transition is not allowed between the states. "Anybody" 606 indicates that any user can change transition state. "User ID" 608 indicates that only the specified user 610 (chosen from a list) can change transition state. "Group" 612 indicates that only the users belonging to a specified group 614 (chosen from a list) can change transition state. Checking the electronic signature requirement 602 prompts the user for an electronic signature when the state transition occurs.

Figure 7A:
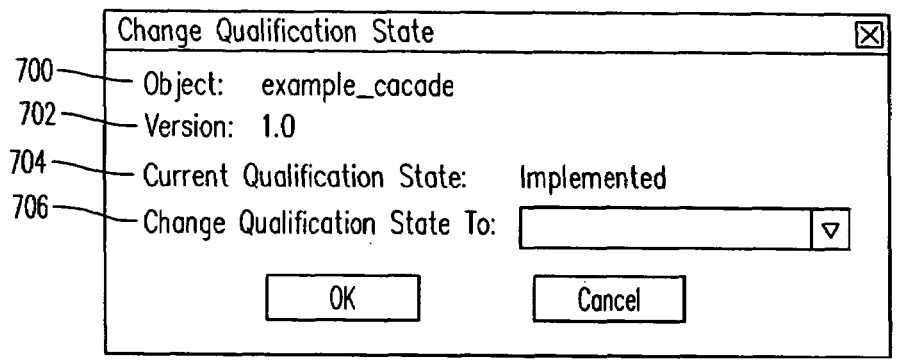
FIGS. 7A and 7B are screenshots of an example user interface for changing a qualification state.
Figure 7B:
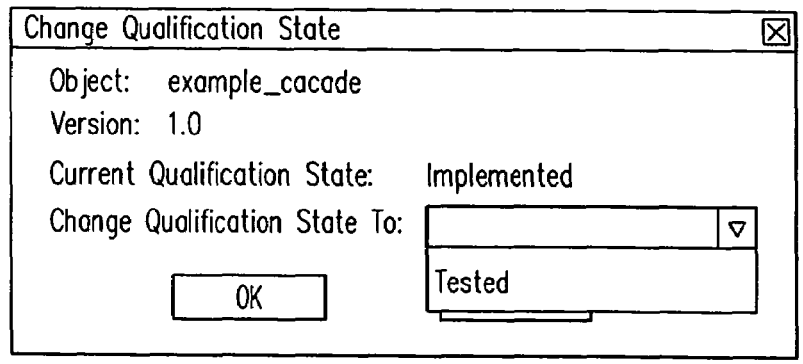

FIGS. 7A and 7B shows an example user interface for changing a qualification state. As part of qualification state transitions, this user interface is invoked to accommodate transitioning from one state to another. The object 700, its current version 702, and qualification state 704 are displayed with an option to change the qualification state to another pre-defined value 706. Only allowed state transitions are shown in the drop down menu as shown in FIG. 7B.

Figure 8:
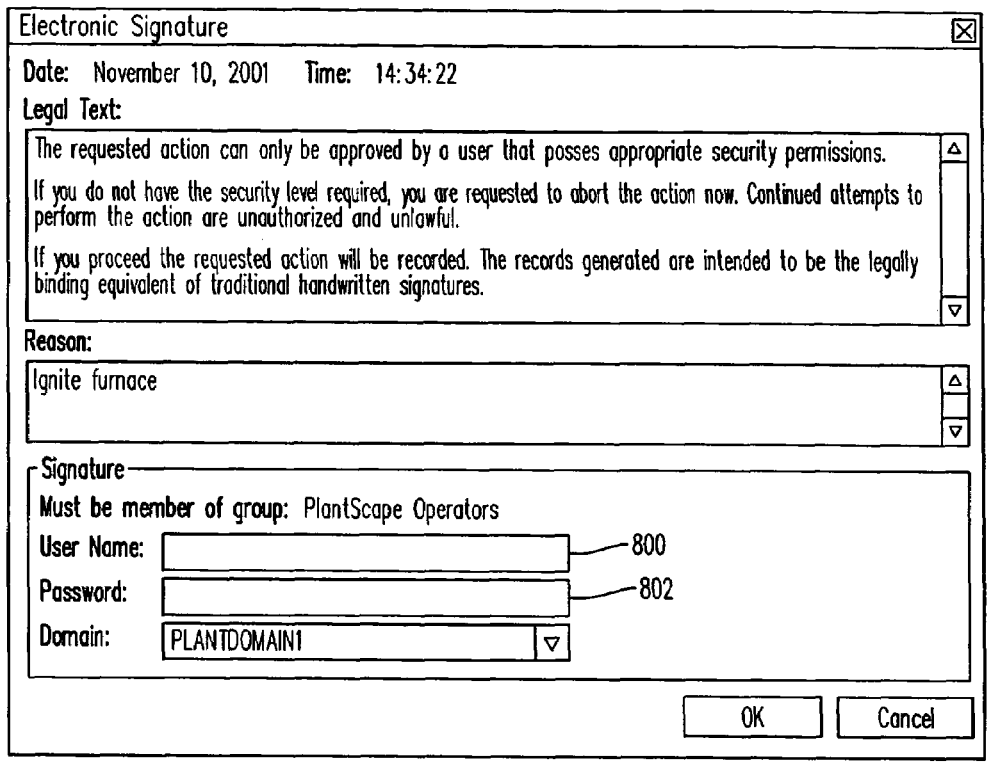
FIG. 8 is a screenshot of an example user interface for entering an electronic signature.

FIG. 8 shows an example user interface for entering an electronic signature. For some qualification state transitions, the source control system is configured by the user to require verification by validating an electronic signature. To validate the electronic signature, an electronic signature component is invoked. The user name 800 and password 802 are entered before a time-out period expires.

Figure 9:
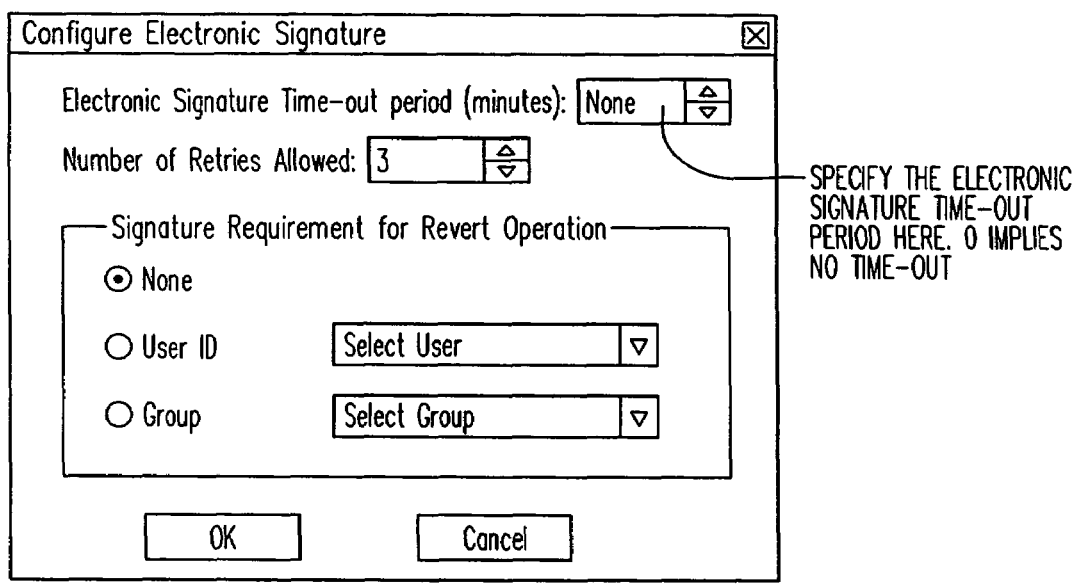
FIG. 9 is a screenshot of an example user interface for configuring electronic signatures.

FIG. 9 shows an example user interface for configuring electronic signatures. The timeout period and the number retries by the user is configurable by the user.

In an example source control system, the number and naming of the qualification states is configurable by the customer. Each version of each object in the source control system is associated with a qualification state. In this way, a procedure for qualification of control strategies is enforceable. Each qualification state has an attribute indicating if it is permissible to load the object to a controller. Each qualification state is defined with a set of other qualification states to which that state may transition. Each qualification state is defined with certain users or groups of users who are authorized to make those transitions. A transition may be associated with an electronic signature requirement. Each qualification state has a fallback state. A fallback state is the state that an object is placed in when it is checked-in to the source control system, after it has been checked-out from the source control system. The first time the object is checked-in the source control system, its qualification state is set to the fallback state of the first defined state. A transition from one qualification state to another is a user-specified action. The qualification state of an object is automatically changed, if necessary, at the time it is checked-into the source control system. Also, the state of a checked-in object is changeable at any time without being part of the check-in. A log entry is generated when the state is changed, including a name of the user, the state the object changed from, and the state the object changed to.

In the example source control system, there is a restricted signing state for each qualification state. If a restricted signing state requires an electronic signature and the state to which a transition is being made also requires an electronic signature, then the two signatures need to be different. A user may specify that a state does not require a restricted signing state. This embodies the Good Automated Manufacturing Practice (GAMP) "Four Eyes" principle. For more information, see "The Good Automated Manufacturing Practice (GAMP) Guide for Validation of Automated Systems in Pharmaceutical Manufacture," available from The Society for Life Science Professionals (≦http://www.ispe.org≧). Changing the qualification state of an object version does not change the version number. A default installation of the source control system includes a database with a single qualification state named "implemented" with an attribute set to allow loading to a controller and a fallback state set to "implemented".

In the example source control system, a user interface is available only to a user having a privilege for configuring qualification states, including the following information: number of states, name of each state, a "load to controller allowed" attribute for each state, a restricted signing state for each state, permitted state transitions, whether authorization is needed for each transition for a specific user or a user who belongs to a specified group, whether electronic signatures are needed for each transition, and a fallback state. In the example source control system, configuration is available in administrative functions.

Figure 10:
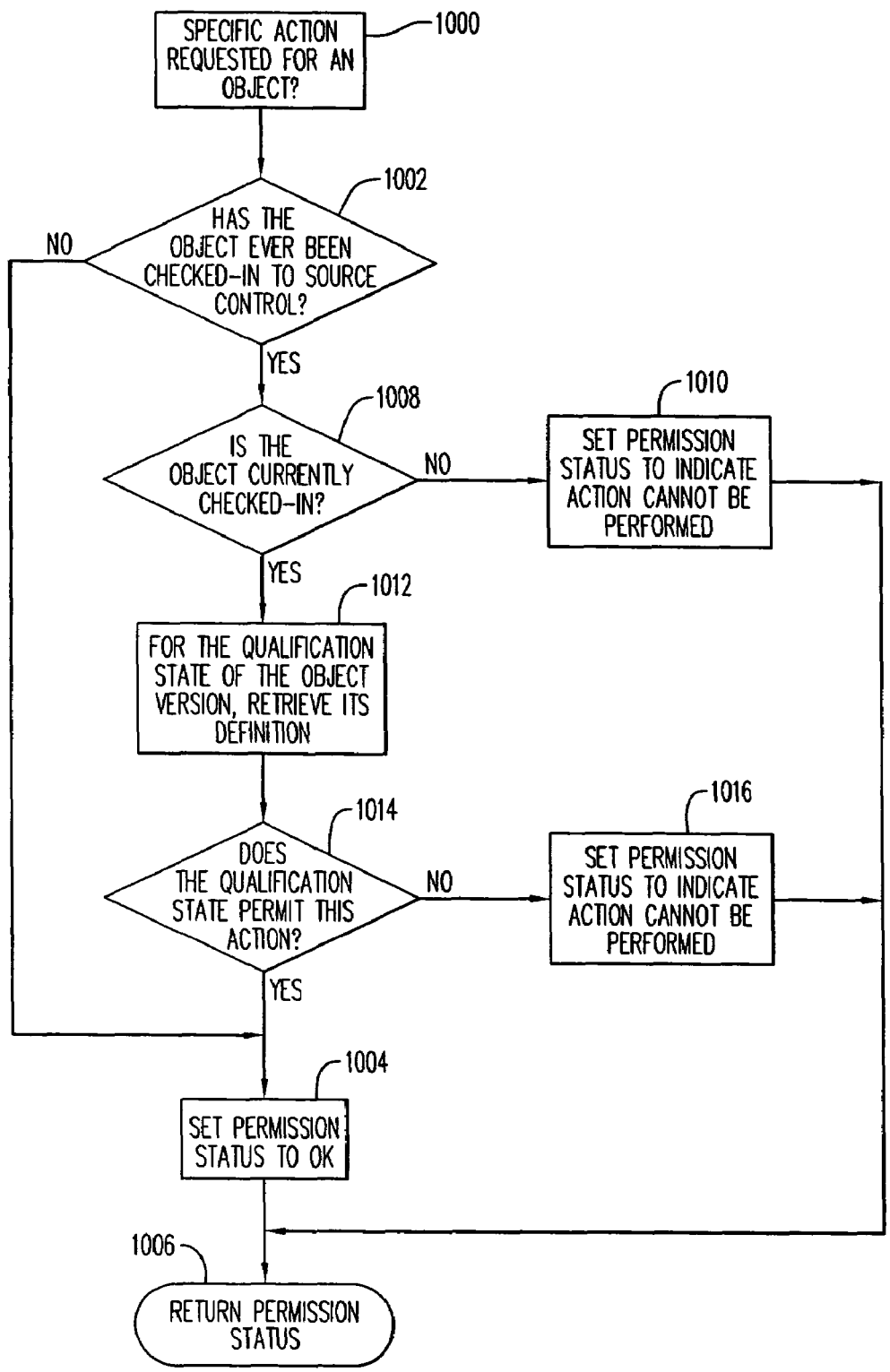
FIG. 10 is a flow chart of an example method of determining permission for an action with an object based on its qualification state.

FIG. 10 shows an example method of determining permission for an action with an object based on its qualification state. Security is described in this example, but is optional in the present invention and may be performed in many different ways. In step 1000, a specific action is requested for an object. In step 1002, it is determined whether the object has ever been checked-in to the source control system. If not, control flows to step 1004, where the permission status is set to okay and, then, control flows to step 1006, where the permission status is returned. Status setting and other error processing are shown in this example and other flow charts, but may be omitted or done in many different ways. In step 1002, if the object has been checked-in before, then control flows to step 1008. In step 1008, it is determined if the object is currently checked-in. If not, control flows to step 1010, where the permission status is set to indicate that the action cannot be performed and, then, control flows to step 1006. Otherwise, if the object is currently checked-in, control flows to step 1012. In step 1012, a definition of the qualification state of the object is retrieved. In step 1014, it is determined if the qualification state permits the action requested in step 1000. If not, control flows to step 1016, where the permission status is set to indicate that the action cannot be performed and, then, control flows to step 1006. Otherwise, if the qualification state permits the action, then control flows to step 1004.

Figure 11:
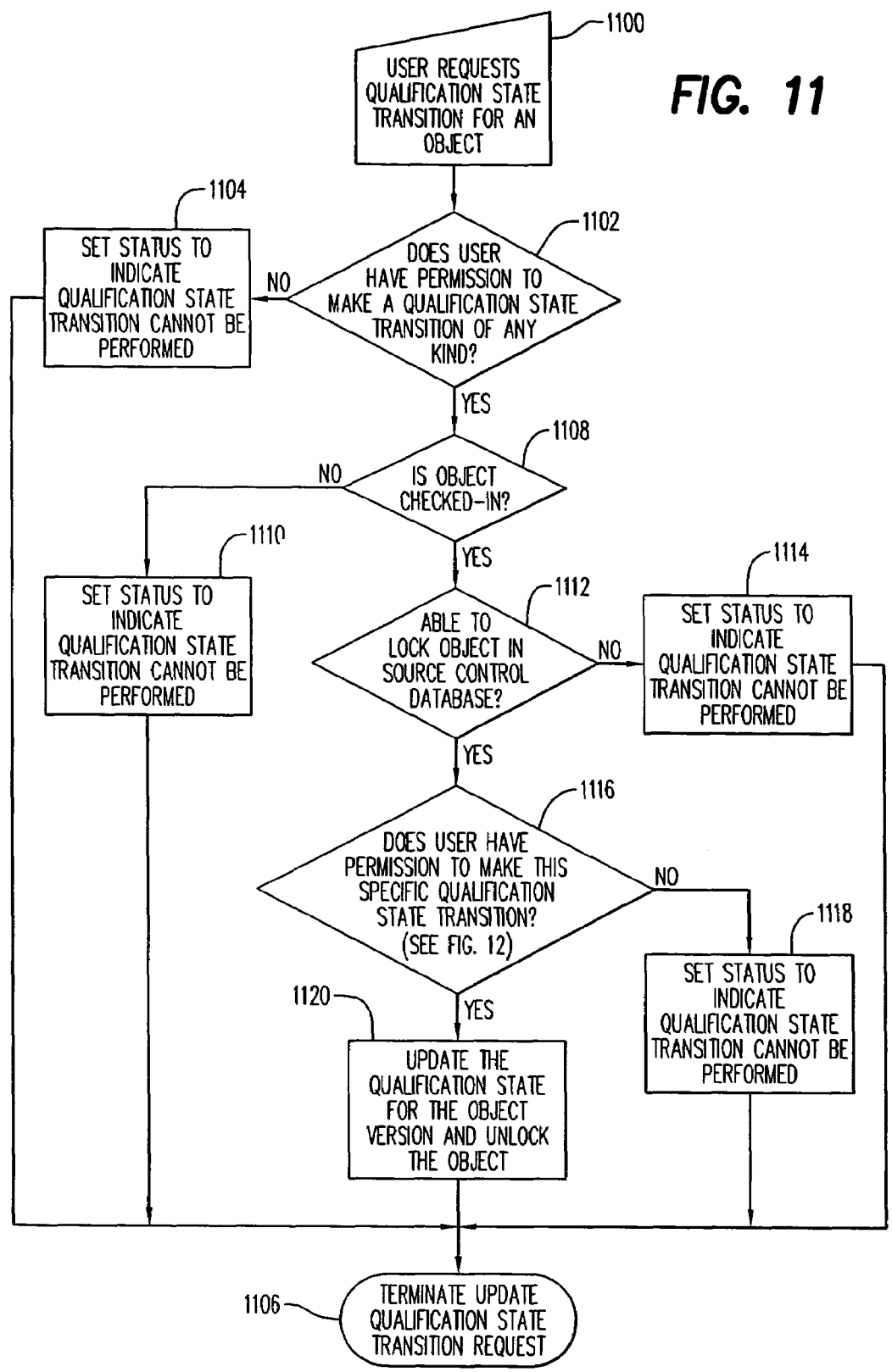
FIG. 11 is a flow chart of an example method of validating a qualification state transition.

FIG. 11 shows an example method of validating a qualification state transition. In step 1100, the user requests a qualification state transition for an object. In step 1102, it is determined whether the user has permission to make a qualification state transition of any kind. If not, control flows to step 1104, where a status is set to indicate that the qualification state transition cannot be performed and, then, control flows to step 1106, where the processing for the request to update the qualification state terminates. Otherwise, if the user has permission, control flows to step 1108. In step 1008, it is determined whether the object is checked-in. If not, control flows to step 1110, where the status is set to indicate that the qualification state transition cannot be performed and, then, control flows to step 1106. Otherwise, if the object is checked in, control flows to step 1112. In step 1112, it is determined if the object can be locked in a source control database. The source control database is any type of storage device capable of storing information about objects in the source control system, such as version numbers. If the object cannot be locked, control flows to step 1114, where the status is set to indicate that the qualification state transition cannot be performed and, then, control flows to step 1106. Otherwise, if the object can be locked, control flows to step 1116. In step 1116, it is determined whether the user has permission to make this specific qualification state transition. (See FIG. 12 for a method of validating a qualification state transition based on transition restrictions). If not, control flows to step 1118, where the status is set to indicate that the qualification state transition cannot be performed and, then, control flows to step 1106. Otherwise, if the user has permission, control flows to step 1120, where the qualification state is updated for the object version and the object is unlocked. Then, control flows to step 1106 and the request processing terminates.

Figure 12:
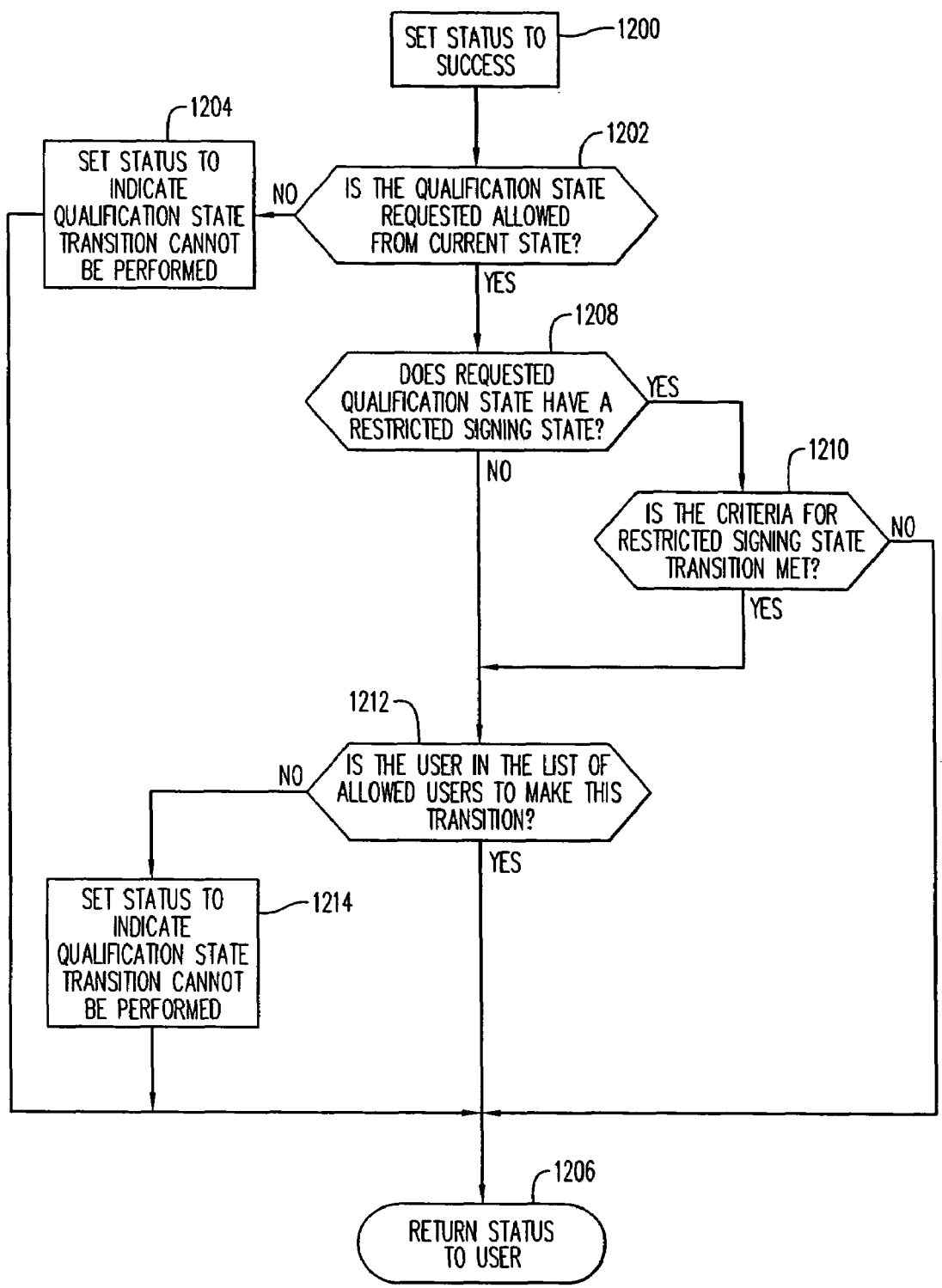
FIG. 12 is a flow chart of an example method of validating a qualification state transition based on transition restrictions.

FIG. 12 shows an example method of validating a qualification state transition based on transition restrictions. In step 1200, a status is set to success. In step 1202, it is determined whether the qualification state requested is allowed from the current state. If not, control flows to step 1204, where the status is set to indicate that the qualification state transition cannot be performed and, then, control flows to step 1206, where the status is returned to the user. Otherwise, if the transition is allowed from the current state, control flows to step 1208. In step 1208, it is determined whether the requested qualification state has a restricted signing state. If so, control flows to step 1210, where it is determined whether the criteria for is met restricted signing for the state transition. If not, control flows to step 1206. Otherwise, control flows to step 1212. In step 1212, it is determined whether the user is in the list of allowed users to make this transition. If not, control flows to step 1214, where the status is set to indicate that the qualification state transition cannot be performed and, then, control flows to step 1206. Otherwise, if the user is in the list, control flows to step 1206.

Figure 13:
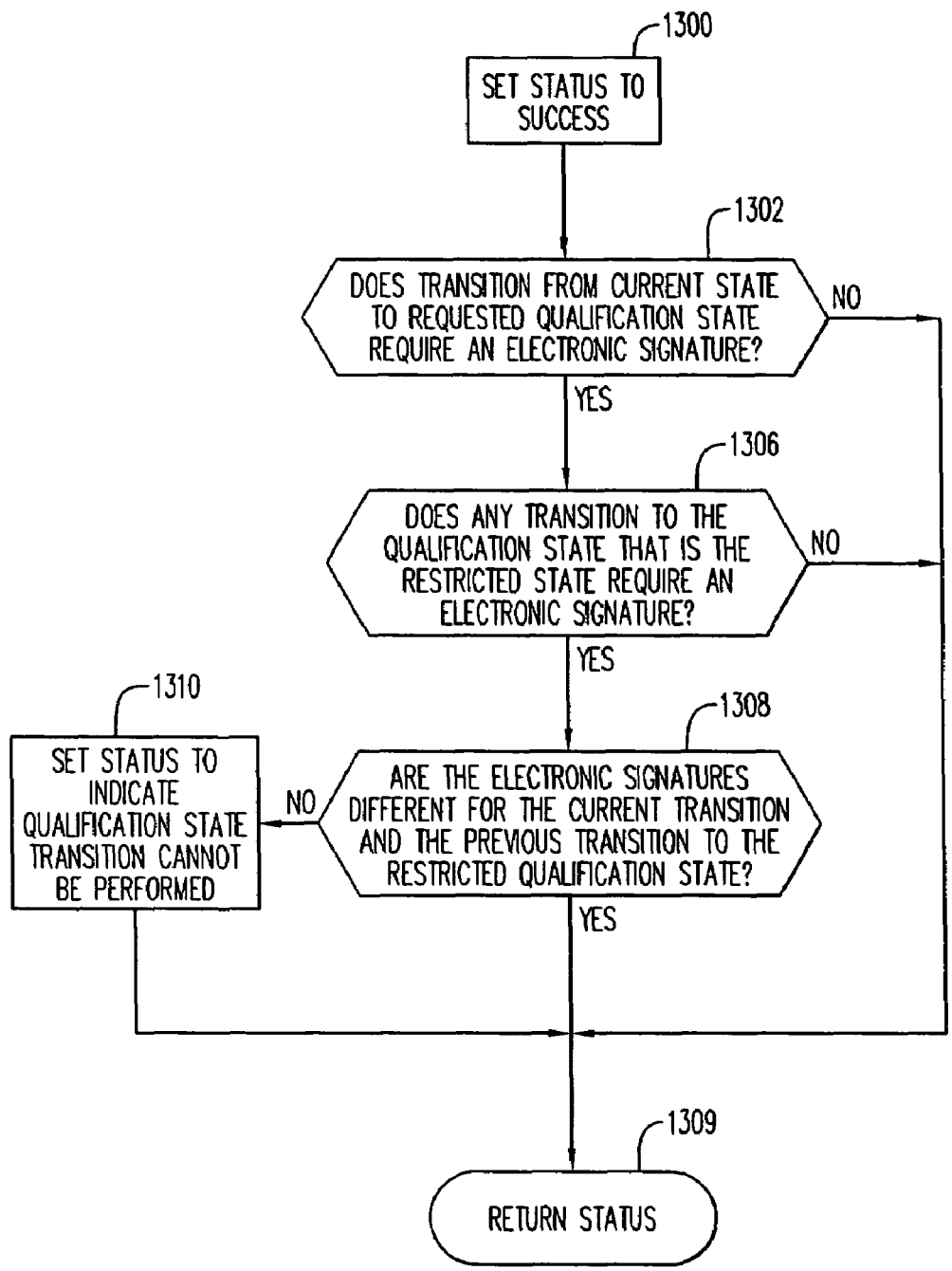
FIG. 13 is a flow chart of an example method of validating a qualification state transition based on restricted signing.

FIG. 13 shows an example method of validating a qualification state transition based on restricted signing. In step 1300, the status is set to success. In step 1302, it is determined whether the transition from the current state to the requested qualification state requires an electronic signature. If not, control flows to step 1309, where the status is returned. Otherwise, if it requires an electronic signature, control flows to step 1306. In step 1306, it is determined whether any transition to the qualification state that is the restricted state requires an electronic signature. If not, control flows to step 1309. Otherwise, control flows to step 1308. In step 1308, it is determined whether the electronic signatures are different for the current transition and the previous transition to the restricted qualification state. If so, control flows to step 1309. If not, control flows to step 1310, where the status is set to indicate that the qualification state transition cannot be performed and, then, control flows to step 1309.

Figure 14:
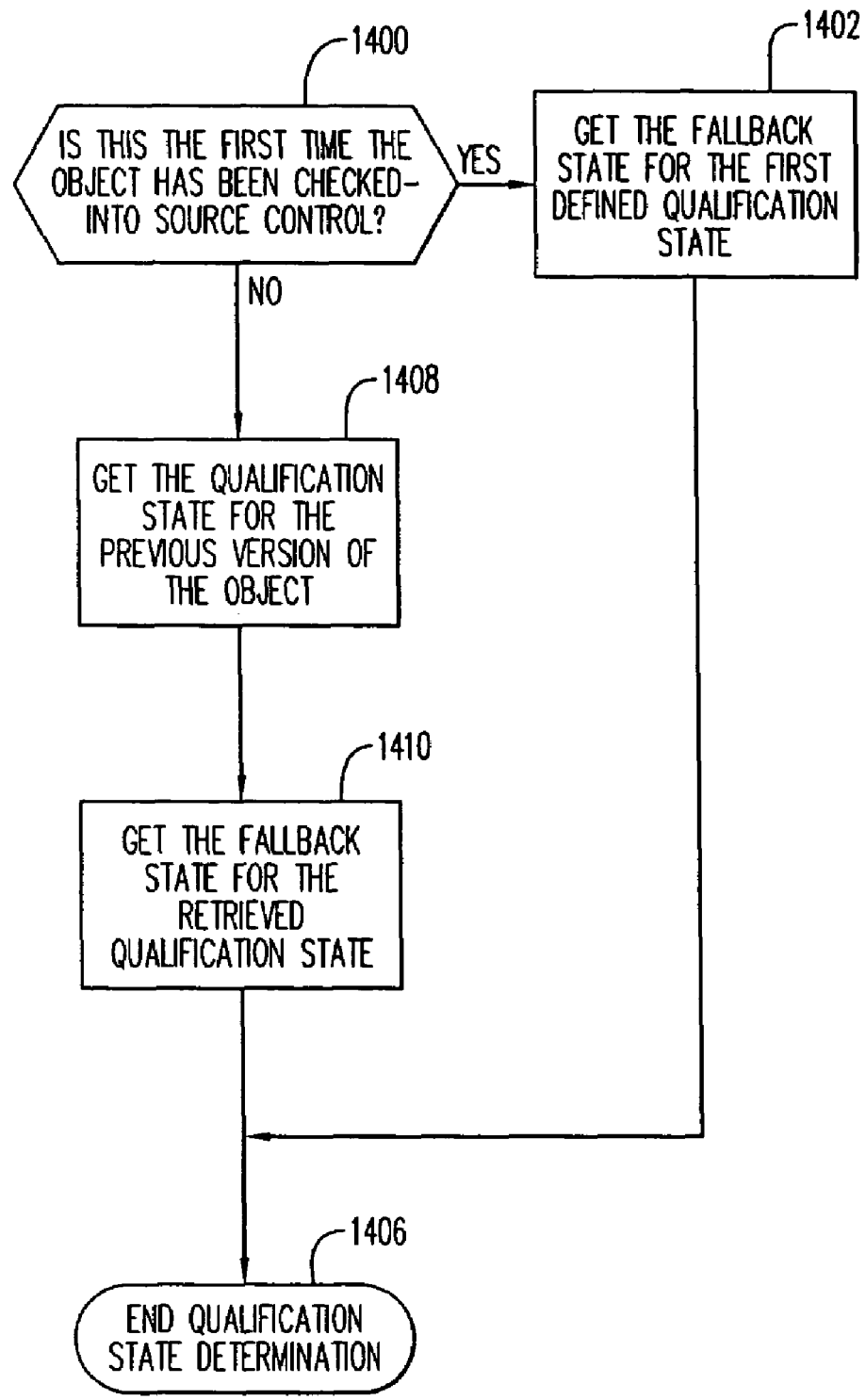

FIG. 14 shows an example method of determining the qualification state for an object version upon check-in. In step 1400, it is determined whether this is the first time the object has been checked-in to the source control system. If so, control flows to step 1402, where the fallback state for the first defined qualification state is retrieved and, then, control flows to step 1406, the end of the qualification state determination. Otherwise, if it is not the first time, control flows to step 1408. In step 1408, the qualification state is retrieved for the previous version of the object. In step 1410, the fallback state is retrieved for the retrieved qualification state.

Figure 15:
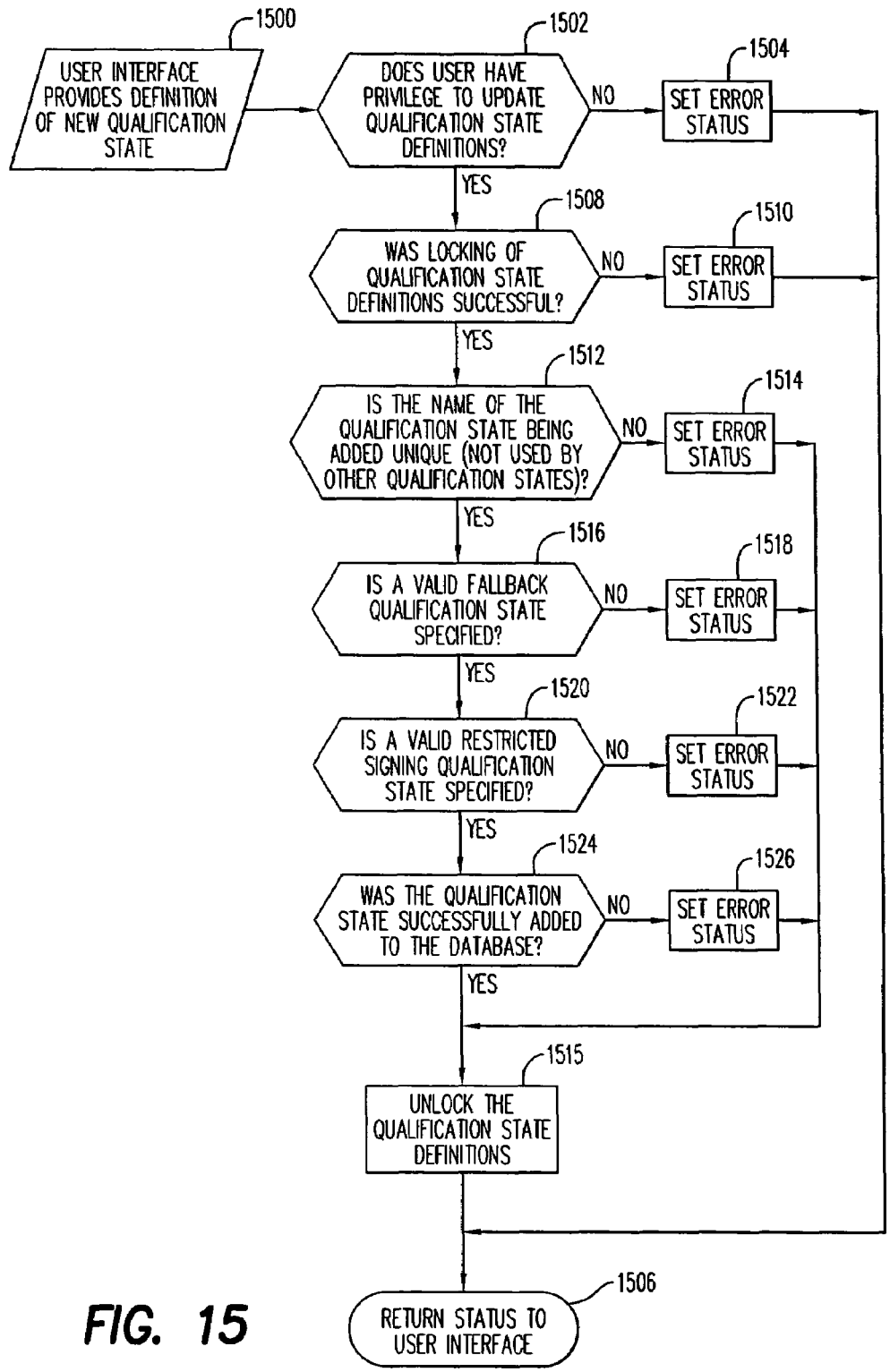
FIG. 15 is a flow chart of an example method of processing the addition of a qualification state.

FIG. 15 shows an example method of processing the addition of a qualification state. In step 1500, receiving a definition of a new qualification state from a user through a user interface. In step 1502, it is determined whether the user has the privilege to update the qualification state definitions. If not, control flows to step 1504, where an error status is set and, then, control flows to step 1506, where the status is returned to the user. Otherwise, if the user has the privilege, control flows to step 1508. In step 1508, it is determined whether the locking of the qualification state definitions was successful. If not, control flows to step 1510, where an error status is set and, then, control flows to step 1506. Otherwise, if the locking was successful, control flows to step 1512. In step 1512, it is determined whether the name of the qualification state being added is unique, i.e., not used by other qualification states. If not, control flows to step 1514, where an error status is set and, then, control flows to step 1515. In step 1515, the qualification state definitions are unlocked and, then, control flows to step 1506. Otherwise, if the name is unique, control flows to step 1516. In step 1516, it is determined whether there is a valid fallback qualification state specified. If not, control flows to step 1 518, where an error status is set and, then, control flows to step 1515. Otherwise, if there is a valid fallback qualification state, control flows to step 1520. In step 1520, it is determined whether a valid restricted signing qualification state is specified. If not, control flows to step 1522, where an error status is set and, then, control flows to step 1515. Otherwise, if a valid restricted signing qualification state is specified, control flows to step 1524. In step 1524, it is determined whether the qualification state was successfully added to the database. If not, control flows to step 1522, where an error status is set and, then, control flows to step 1515. Otherwise, if it was successfully added, control flows to step 1515.

Figure 16:
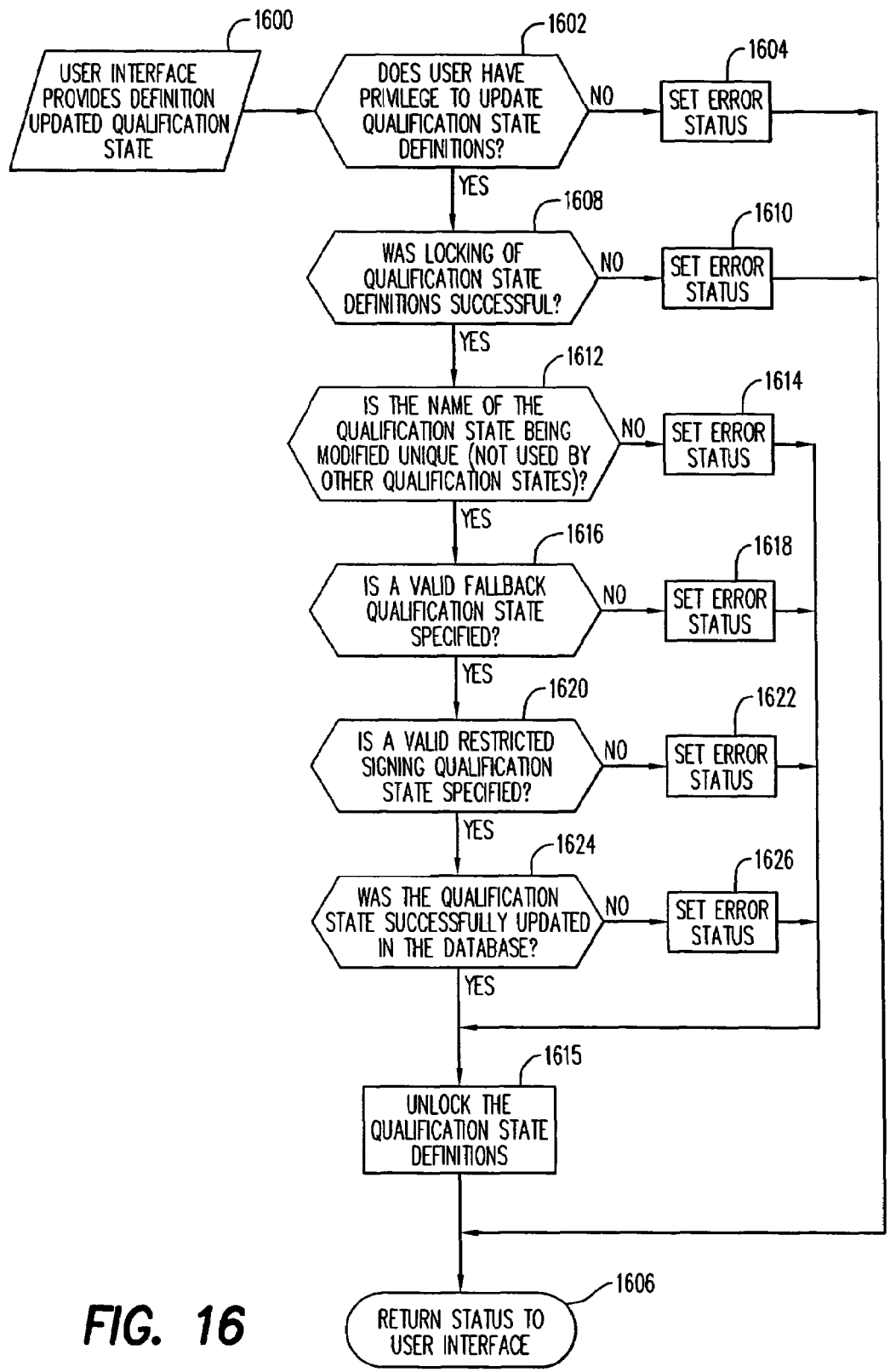
FIG. 16 is a flow chart of an example method of processing the modification of a qualification state.

FIG. 16 shows an example method of processing the modification of a qualification state. In step 1600, receiving a definition of an updated qualification state from the user through a user interface. In step 1602, it is determined whether the user has the privilege to update the qualification state definitions. If not, control flows to step 1604, where an error status is set and, then, control flows to step 1606, where the status is returned to the user interface. Otherwise, if the user has the privilege, control flows to step 1608. In step 1608, it is determined whether the locking of the qualification state definitions was successful. If not, control flows to step 1610, where an error status is set and, then, control flows to step 1606. Otherwise, if the locking was successful, control flows to step 1612. In step 1612, it is determined whether the new name of the qualification state being modified is unique, i.e., not used by any other qualification states. If not, control flows to step 1614, where an error status is set and, then, control flows to step 1615, where the qualification state definitions are unlocked. Otherwise, if the name is unique, control flows to step 1616. In step 1616, it is determined whether a valid fallback qualification state is specified. If not, control flows to step 1618, where an error status is set and, then, control flows to step 1615. Otherwise, if a valid fallback qualification state is specified, control flows to step 1620. In step 1620, it is determined whether a valid restricted signing qualification state is specified. If not, control flows to step 1622, where an error status is set and, then, control flows to step 1615. Otherwise, if a valid restricted signing state is specified, control flows to step 1624. In step 1624, it is determined whether the qualification state was successfully updated in the database. If not, control flows to step 1626, where an error status is set and, then, control flows to step 1615. Otherwise, if the qualification state was successfully updated, then control flows to step 1615.

Figure 17:
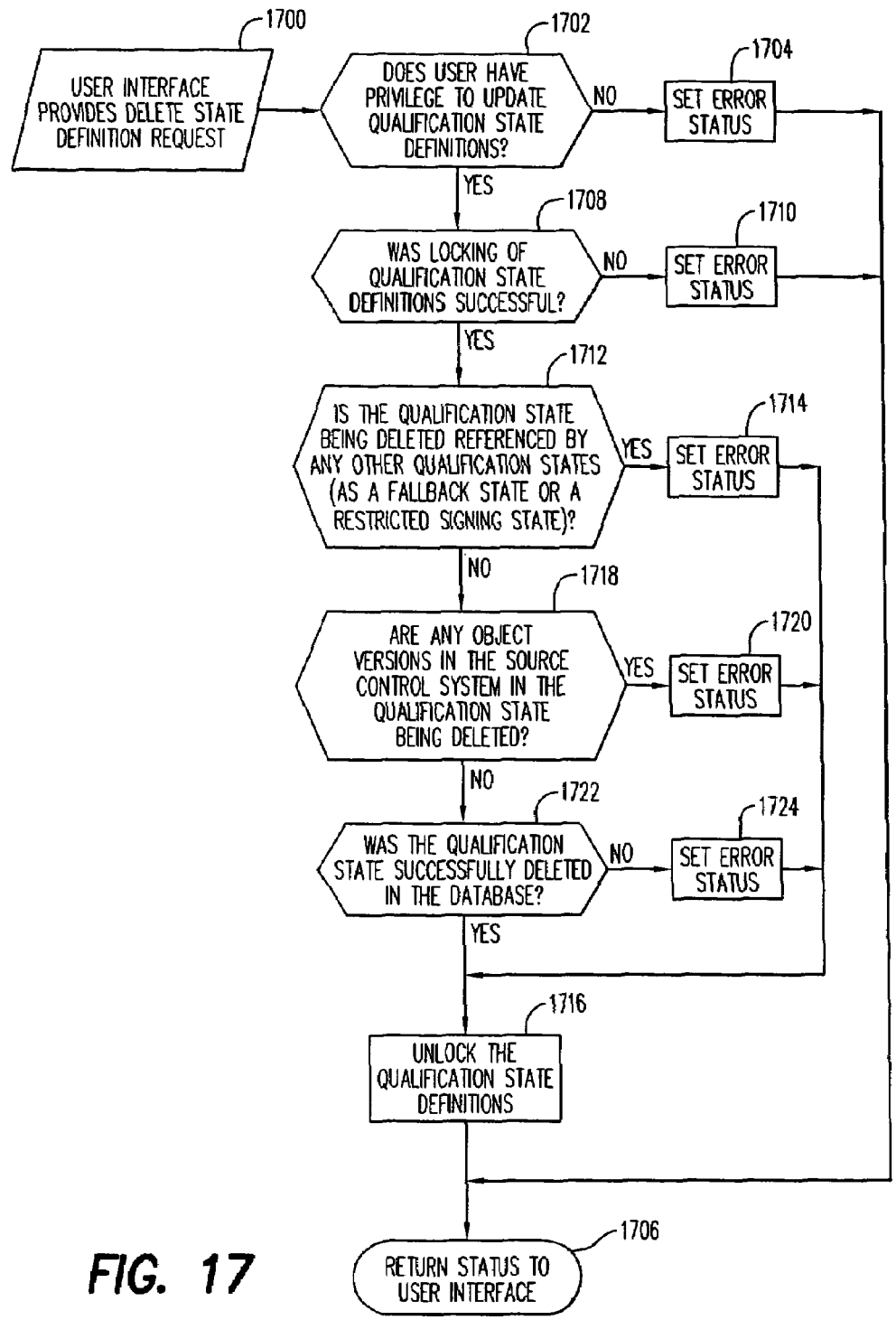
FIG. 17 is a flow chart of an example method of processing the deleting of a qualification state.

FIG. 17 shows an example method of processing the deleting of a qualification state. In step 1700, receiving a request to delete a qualification state definition from a user through a user interface. In step 1702, it is determined whether the user has the privilege to update the qualification state definitions. If not, control flows to step 1704, where an error status is set and, then, control flows to step 1706, where the status is returned to the user interface. Otherwise, if the user has the privilege, control flows to step 1708. In step 1708, it is determined whether the locking of the qualification state definitions was successful. If not, control flows to step 1710, where an error status is set and, then, control flows to step 1706. Otherwise, if the locking was successful, control flows to step 1712. In step 1712, it is determined whether the qualification state being deleted is referenced by any other qualification states as a fallback state, or a restricted signing state. If so, control flows to step 1714, where an error status is set and, then, control flows to step 1716, where the qualification state definitions are unlocked. Otherwise, if the qualification state being deleted is not referenced, then control flows to step 1718. In step 1718, it is determined whether there are any object versions in the source control system that are currently in the qualification state being deleted. If so, control flows to step 1720, where an error status is set and, then, control flows to step 1716. Otherwise, if no objects are in the qualification state being deleted, control flows to step 1722. In step 1722, it is determined whether the qualification state was successfully deleted from the database. If not, control flows to step 1724, where an error status is set and, then, control flows to step 1716. Otherwise, if the deletion was successful, control flows to step 1716.

Figure 18:
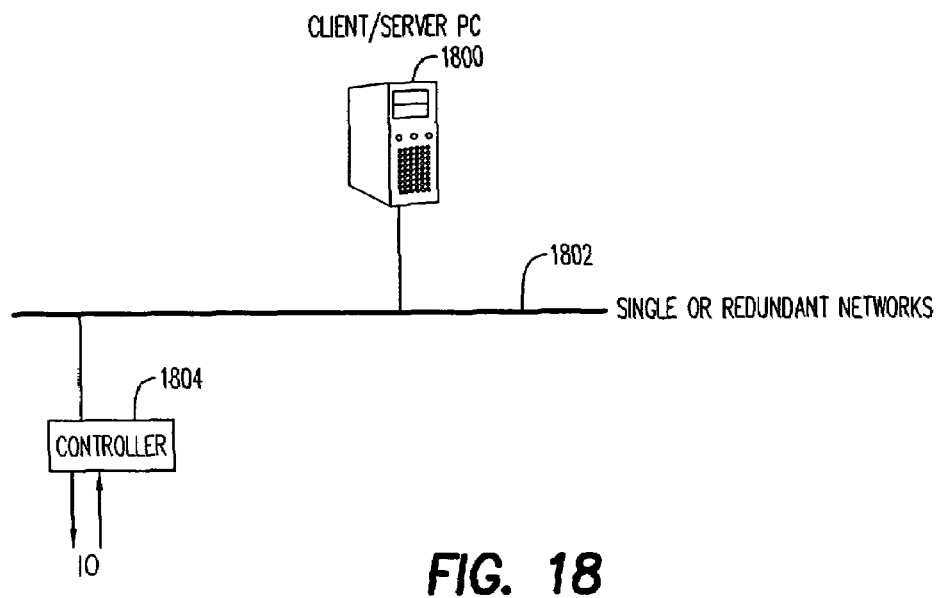
FIG. 18 is a block diagram of an example system architecture for a source control system having an enforceable user-defined life cycle.

FIG. 18 shows an example system architecture for a source control system having an enforceable user-defined life cycle. A client/server PC 1800 is coupled via a network 1802 to a controller 1804 which communicates with various devices to provide process control. The client/server PC 1800 acts as both a client and a server so that a user has access to the source control system and the ability to command a load. Control strategies in a source control system are loaded from client/server 1800 to controller 1804, once they are in the appropriate life cycle state.

Figure 19:
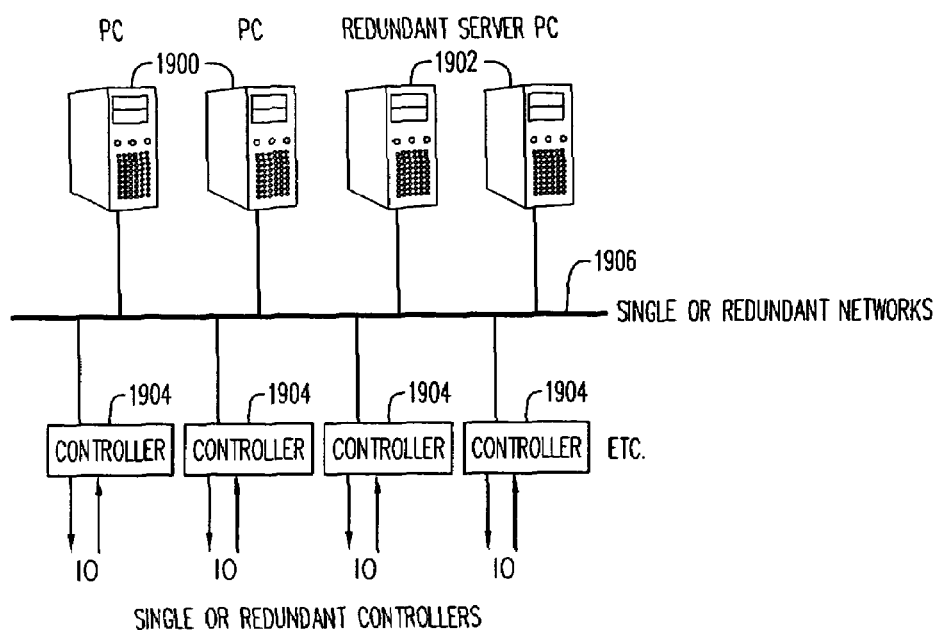
FIG. 19 is a block diagram of another example system architecture for a source control system having an enforceable user-defined life cycle.

FIG. 19 shows another example system architecture for a source control system having an enforceable user-defined life cycle. Client PCs 1900 are used by operators to control a plant. Client PCs 1900 communicate with redundant server PCs 1902. Redundant server PCs 1902 are data engines or servers that provide data from the plant to client PCs 1900. Redundant server PCs 1902 are an alternative for greater availability than the single server PC 1800 of FIG. 18. When redundant server PCs 1902 are used, a back-up server takes over if a primary server fails. Control strategies in a source control system are loaded by PC 1900 or server 1902 to a controller 1904 over a network 1906, once they are in the appropriate life cycle state. Controllers 1904 communicate with various devices in a process control system.

It is to be understood that the above description is intended to be illustrative and not restrictive. Many other embodiments will be apparent to those of skill in the art upon reviewing the above description, such as adaptations of the present disclosure to control system configuration for applications other than process control systems. Various designs using hardware, software, and firmware are contemplated by the present disclosure, even though some minor elements would need to change to better support the environments common to such systems and methods. The present disclosure has applicability to fields outside process control, such as software development environments and other kinds of systems needing control system configuration. Therefore, the scope of the present disclosure should be determined with reference to the appended claims, along with the full scope of equivalents to which such claims are entitled.

What is claimed is:

1. A method, executed by a processor, for enforcing a life cycle process in a source control system, comprising:
    providing a check-in function to check-in at least one object of a control strategy for a process control system to said source control system;
    providing a check-out function to check said object out of said source control system;
    receiving from a user a plurality of user-defined qualification states and a plurality of user-defined state transitions between the plurality of user defined qualification states of said life cycle process;
    performing said life cycle process on said object of a control strategy for a process control system by subjecting said object when checked out to said plurality of user-defined qualification states, each user-defined qualification state having attributes;
    providing a change state function for a user to change a current one of said user-defined qualification states to a next one of said user-defined qualification states, said change state function verifying compliance with said user-defined state transitions; and
    providing version control for said object in said source control system.

2. The method according to claim 1, wherein said attributes include a fallback state.

3. The method according to claim 1, further comprising:
    receiving user-defined security for said user-defined state transitions.

4. The method according to claim 3, wherein said user-defined security includes electronic signatures.

5. The method according to claim 3, wherein said user-defined security includes which users have permission to make which state transitions.

6. The method according to claim 5, wherein receiving user-defined state transitions between said plurality of user-defined qualification states is performed through a user interface having an editable table, said table having state names as rows and column and having cells indicating which users have permission to make which state transitions.

7. The method according to claim 1, wherein said attributes include whether said control strategy is loadable to a controller.

8. The method according to claim 7, wherein said user-defined qualification states comprise a state of testing, and wherein a user requests one of said user-defined state transitions to said state of testing for testing said object loaded into said controller.

9. The method according to claim 1, wherein receiving said user-defined life cycle process having said plurality of user-defined qualification states, each user-defined qualification state having attributes is performed through a user interface having an editable table, said table having state names as rows and attributes as columns and having cells indicating values for said attributes.

10. A computer readable medium having executable instructions stored thereon to perform a method in a life cycle process of determining permissions for actions with an object of a control strategy for a process control system based on a user defined state of said object, said method comprising:
receiving from said user a plurality of definitions of a plurality of user-defined qualification states and a plurality of user-defined state transitions between the plurality of user-defined qualification states of said life cycle process;
performing said life cycle process on said object of a control strategy for a process control system by subjecting said object to said plurality of user-defined qualification states;
receiving a request to perform one of said actions with said object;
determining whether said object has ever been checked-in to a source control system;
determining whether said object is currently checked-in;
retrieving from said plurality of definitions a definition of said user-defined qualification state of said object that corresponds to said action;
determining from said definition whether said action is permissible in said state; and
providing a permission status to perform or not perform said action with said object.

11. The computer readable medium of claim 10, further comprising:
determining a new state for a version of said object upon check-in by:
determining whether said version of said object is being checked-in for a first time;
retrieving a first fallback user-defined qualification state from said plurality of user-defined qualification states for a first pre-defined user-defined qualification state, if said version of said object is being checked-in for said first time, wherein said fallback user-defined qualification state is a life cycle stage of said qualification process; and
providing said first fallback user-defined qualification state, if said object is being checked-in for said first time.

12. The computer readable medium according to claim 11, comprising:
retrieving from said user a current user-defined qualification state for a current version of said object, if said object is not being checked-in for said first time;
retrieving a current fallback user-defined qualification state for said current user-defined qualification state of said object, if said object is not being checked-in for said first time; and
providing said current fallback user-defined qualification state, if said object is not being checked-in for said first time.

13. A computer readable medium having executable instructions stored thereon to perform a method comprising:
receiving from a user a plurality of user defined qualification states and a plurality of user-defined state transitions between the plurality of user-defined qualification states of a life cycle process;
receiving a request to make a user defined state transition from one of said user-defined qualification states to a next one of said user-defined qualification states for an object from a user;
performing a life cycle process on an object of a control strategy for a process control system by subjecting said object to said plurality of user-defined qualification states;
determining whether said object is checked-in;
determining whether said user has permission to make said state transition based on a user-defined state transition model that comprises restrictions and permissions for said user defined state transitions;
permitting said state transition, if said user has permission; and
providing a state transition status.

14. A computer readable medium having executable instructions stored thereon to perform a method of qualifying an object of a control strategy for a process control system pursuant to a life cycle process, said method comprising:
receiving from a user a plurality of user-defined qualification states and a plurality of user-defined state transitions between the plurality of user-defined qualification states of a life cycle process;
performing said life cycle process on said object of a control strategy for a process control system by subjecting said object to said plurality of user-defined qualification states;
validating a user defined state transition from a current user-defined qualification state to a next user-defined qualification state of said plurality of user-defined qualification states by:
determining whether said next user-defined qualification state in a state transition request from a user is allowed from said current user-defined qualification state in said user-defined state transition request based on said user-defined transition restrictions;
determining whether said user has permission to make said user-defined state transition based on said user-defined transition restrictions;
determining whether said state transition has a restricted signing requirement and, if so, verifying that said restricted signing requirement is met; and
providing a state transition status.

15. A computer readable medium having executable instructions stored thereon to perform a method of validating a user-defined state transition of a life cycle process in a source control system, said method comprising:

receiving from a user a plurality of user-defined qualification states and a plurality of user-defined state transitions between the plurality of user-defined qualification states of a life cycle process;

performing said life cycle process on an object of a control strategy for a process control system by subjecting said object to said plurality of user-defined qualification states;

determining whether a current user-defined state transition in a state transition request for an object from a user requires an electronic signature based on user-defined transition restrictions of said life cycle process;

determining whether a previous user-defined state transition for said object required a previous electronic signature, if said current user-defined state transition requires a current electronic signature;

allowing said current user-defined state transition only if said previous electronic signature is different than said current electronic signature; and providing a validation status.

16. A computer readable medium having executable instructions stored thereon to perform a method for qualifying a control strategy for a process control system comprising:

receiving from a user a plurality of user-defined qualification states and a plurality of user-defined state transitions between the plurality of user-defined qualification states of a life cycle process;

processing an addition of a new user-defined qualification state to said a plurality of user-defined qualification states by:

receiving a definition of said new user-defined qualification state from a user, said definition including a name and a fallback user-defined qualification state, wherein said fallback user-defined qualification state is a life cycle stage of a qualification process, and wherein said new user-defined qualification state comprises an attribute of whether said control strategy is loadable to a controller of said process control system;

determining whether said name is unique among existing user-defined qualification state definitions of said plurality of user-defined qualification states;

validating said fallback user-defined qualification state; and adding said definition to a source control system, only if said name is unique and said fallback user-defined qualification state is valid.

17. computer readable medium according to claim 16, wherein said definition includes a restricted signing requirement and further comprising:

validating said restricted signing requirement; and wherein said adding said definition to said source control system is performed on an additional condition of whether said restricted signing requirement is valid.

18. The computer readable medium according to claim 16, further comprising:

determining whether said user has a privilege to edit said definition; and wherein said adding said definition to said source control system is performed on an additional condition of whether said user has said privilege.

19. A computer readable medium having executable instructions stored thereon to perform a method for qualifying a control strategy for a process control system comprising:

receiving from a user a plurality of user-defined qualification states of a user-defined qualification process for said control strategy;

processing a modification of a qualification state of said plurality of said user-defined qualification states of said user-defined qualification process by:

receiving a modified definition of said user-defined qualification state from a user, said modified definition including a name and a fallback user-defined qualification state, wherein said fallback user-defined qualification state is a life cycle stage of said qualification process, and wherein said user-defined qualification state for which said modified definition was received comprises an attribute of whether said control strategy is loadable to a controller of said process control system;

determining whether said name is unique among existing user defined qualification state definitions;

validating said fallback user-defined qualification state; and updating said modified definition in a source control system, only if said name is unique and said fallback user-defined qualification state is valid.

20. The computer readable medium according to claim 19, wherein said definition includes a restricted signing requirement and further comprising:

validating said restricted signing requirement; and wherein said updating said modified definition in said source control system is performed on an additional condition of whether said restricted signing requirement is valid.

21. The computer readable medium according to claim 19, further comprising:

determining whether said user has a privilege to edit said definition; and wherein said updating said modified definition in said source control system is performed on an additional condition of whether said user has said privilege.

22. A computer readable medium having executable instructions stored thereon to perform a method for qualifying a control strategy for a process control system comprising:

receiving from a user a plurality of user-defined qualification states and a plurality of user-defined state transitions between the plurality of user-defined qualification states of a life cycle process of a source control system, and wherein at least one of said user-defined qualification states comprises an attribute of whether said control strategy is loadable to a controller of said process control system;

processing a deletion of a user-defined qualification state of said plurality of user-defined qualification states in said life cycle process of said source control system by:

receiving a request to delete a user-defined qualification state definition for said user-defined qualification state from a user;

determining whether said user-defined qualification state definition is referenced by any other user-defined qualification state definition in said source control system;

determining whether any objects in said source control system have a current user-defined qualification state equal to said user-defined qualification state;

deleting said user-defined qualification state definition from said source control system, only if said user-defined qualification state definition is not referenced by any other user-defined qualification state definition in said source control system and no objects in said source control system have said current user-defined qualification state equal to said user-defined qualification state.

23. The computer readable medium according to claim 22, further comprising:
  determining whether said user has a privilege to delete said definition; and
  wherein said deleting said state definition from said source control system is performed on an additional condition of whether said user has said privilege.

24. A source control system for a process control system, comprising:
  a processor;
  a life cycle process component executable on said processor to receive from a user a plurality of user-defined life cycle qualification states and to enforce compliance with said user-defined life cycle qualification states for at least one object of a control strategy of a plurality of devices of said process control system, wherein said life cycle process component subjects said object to said user-defined life cycle qualification states;
  a version control component executable on said processor to associate one or more version numbers with said object;
  a state configuration component executable on said processor to receive state information from a user for each user-defined life cycle qualification state; and
  a controller in communication with said processor via a network to be loaded with said object to provide process control of said plurality of devices according to said control strategy when one of said life cycle qualification states qualifies said object for loading to said controller.

25. The system according to claim 24, further comprising: another processor to back-up said processor.

26. The system according to claim 24, wherein said state information includes a state name and an indication of whether load to controller is allowed from that state.

27. The system according to claim 24, wherein said state information includes a fallback user-defined life cycle qualification state.

28. The system according to claim 24, wherein said state information includes an indication of whether restricted signing is needed.

29. The system according to claim 24, wherein said state configuration component provides editing functions for said state information.

30. The system according to claim 24, further comprising:
  a state transition component executable on said processor to receive state transition configuration requirements from a user.

31. The system according to claim 30, wherein said state transition configuration requirements include which users have permission to make particular state transitions.

32. The system according to claim 30, wherein said state transition configuration requirements include an indication of whether an electronic signature is needed to make particular state transitions.

33. The system according to claim 24, wherein said version control component provides check-in and check-out functions.

34. The system according to claim 24, further comprising:
  a change qualification state component to process a qualification state transition request from a user.

* * * * *